United States Patent
Hamann et al.

(10) Patent No.: US 8,606,060 B2
(45) Date of Patent: Dec. 10, 2013

(54) METHOD AND APPARATUS FOR DYNAMIC MANIPULATION AND DISPERSION IN PHOTONIC CRYSTAL DEVICES

(75) Inventors: Hendrik F. Hamann, Yorktown Heights, NY (US); Sharee J. McNab, Christchurch (NZ); Martin P. O'Boyle, Cortland Manor, NY (US); Yurii A. Vlasov, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 1032 days.

(21) Appl. No.: 11/122,152

(22) Filed: May 4, 2005

(65) Prior Publication Data

US 2005/0196101 A1 Sep. 8, 2005

Related U.S. Application Data

(63) Continuation-in-part of application No. 10/686,216, filed on Oct. 15, 2003, now abandoned, and a continuation-in-part of application No. 10/755,816, filed on Jan. 12, 2004, now Pat. No. 7,068,865.

(51) Int. Cl.
  *G02B 6/10* (2006.01)
  *G02B 6/26* (2006.01)
  *G02B 6/032* (2006.01)
  *G02F 1/035* (2006.01)
  *G02F 1/295* (2006.01)

(52) U.S. Cl.
  USPC .......... 385/40; 385/2; 385/5; 385/8; 385/125; 385/129; 385/130; 385/131; 385/132

(58) Field of Classification Search
  USPC .................. 385/2, 5, 8, 40, 125, 129–132
  See application file for complete search history.

(56) References Cited

U.S. PATENT DOCUMENTS

| 4,709,978 | A | | 12/1987 | Jackel |
| 4,879,721 | A | * | 11/1989 | Braski et al. ............ 372/18 |
| 5,526,449 | A | * | 6/1996 | Meade et al. ............ 385/14 |
| 6,002,522 | A | | 12/1999 | Todori et al. |
| 6,468,823 | B1 | | 10/2002 | Scherer et al. |

(Continued)

FOREIGN PATENT DOCUMENTS

JP   2005045162 A   2/2005

OTHER PUBLICATIONS

Espinola, et al., "Thermo-optic Switching Devices in Thin Silicon-On-Insulator," Technical Digest. CLEO '03, Conference on Lasers and Electro-Optics, CWH5, 2003/.

(Continued)

*Primary Examiner* — Ryan Lepisto
*Assistant Examiner* — Jerry Blevins
(74) *Attorney, Agent, or Firm* — Vazken Alexanian (57) ABSTRACT

The present invention is a method and an apparatus for dynamic manipulation and dispersion in photonic crystal devices. In one embodiment, a photonic crystal structure comprises a substrate having a plurality of apertures formed therethrough, a waveguide formed by "removing" a row of apertures, and a plurality of pairs of lateral electrical contacts, the lateral electrical contact pairs extending along the length of the waveguide in a spaced-apart manner. The lateral electrical contact pairs facilitate local manipulation of the photonic crystal structure's refractive index. Thus, optical signals of different wavelengths that propagate through the photonic crystal structure can be dynamically manipulated.

19 Claims, 10 Drawing Sheets (56) References Cited

U.S. PATENT DOCUMENTS

| | | | |
|---|---|---|---|
| 6,545,791 B1* | 4/2003 | McCaughan et al. | 385/2 |
| 6,690,873 B2* | 2/2004 | Bendett et al. | 385/132 |
| 6,735,368 B2 | 5/2004 | Parker et al. | |
| 6,778,722 B1* | 8/2004 | Klocek et al. | 385/16 |
| 6,870,970 B2* | 3/2005 | Leonard et al. | 385/5 |
| 7,068,865 B2* | 6/2006 | Hamann et al. | 385/8 |
| 2002/0048422 A1 | 4/2002 | Cotteverte et al. | |
| 2002/0054726 A1* | 5/2002 | Fondeur et al. | 385/15 |
| 2002/0146196 A1* | 10/2002 | Shirane et al. | 385/16 |
| 2003/0099420 A1* | 5/2003 | Bhowmik et al. | 385/2 |
| 2003/0118262 A1* | 6/2003 | Aoki et al. | 385/8 |
| 2003/0118306 A1* | 6/2003 | Deliwala | 385/125 |
| 2003/0185532 A1* | 10/2003 | Hosomi et al. | 385/129 |
| 2003/0209718 A1* | 11/2003 | Nir | 257/84 |
| 2004/0022492 A1* | 2/2004 | Gunther et al. | 385/40 |
| 2005/0002605 A1* | 1/2005 | Sakai et al. | 385/27 |
| 2005/0029536 A1* | 2/2005 | Sugitatsu et al. | 257/103 |
| 2005/0058388 A1* | 3/2005 | Nomura et al. | 385/14 |

OTHER PUBLICATIONS

Huh, et al., "Nondegenerate Monopole Mode of Single Defect Two-Dimensional Triangular Photonic Band-Gap Cavity", J. Appl. Phys., 92 (2), Jul. 15, 2002 pp. 654-659.

Noda, et al., "Polarization Mode Control of Two-Dimensional Photonic Crystal Laser by Unit Cell Structure Design", Science, 293, Aug. 10, 2011, pp. 1123-1125.

Treyz, G.V., "Silicon Mach-Zehnder Waveguide Interferometers Operating at 1-3pm," Electronics Letters, 27 (2), Jan. 17, 1991, pp. 118-120.

Zhou, et al., "Characteristics of a Photonic Bandgap Single Defect Microcavity Electroluminescent Device",IEEE Journal of Quantum Electronics, 37 (9), Sep. 2001, pp. 1153-1160.

Asheghi, et al., "Thermal Conduction in doped crystal silicom films," Journal of Applied Physics, 91(8), Apr. 15, 2002, 5079-5088.

Asheghi, et al., "Phonon-boundary scattering in thin silicon layers," Appl. Phys. Lett. 71 (13), Sep. 29 1997, 1798-1800.

Espinola, et al., "Fast and Low-Power Thermopotic Switch on Thin Silicon-on-Insulator," IEEE Photoncs Technology Letters, 15(10), Oct. 2003, 1366-1368.

Ju, et al., "Phono scattreing in silicon films with thickness of order 100 nm," Applied Physic Letters, 74(20), May 17, 1999, 3005-3007.

Kasahara, et al., "New Structure of Silica-Based Planar Lightwave Circuits for Low-Power Thermooptic Switch and its Application to 8.times.8 Optical Matrix Switch," Journal of Lightwave Technology, Jun. 20, 2002, 993-1000.

Soljacic, et al., "Photonic-Crystal slow-light enhancement of nonlinear phase sensitivity," J. Opt. Soc. Am, B 19(9), Sep. 2002, 2052-2059.

Soref, et al., "Electrooptical Effects in Silicon," IEEE Journal of Quantum Electronics, QE-23(1), Jan. 1987, 123-129.

Sverdrup, et al. "Measurement of ballistic phonon conduction near hotspots in silicon," Applied Physics Letters, 78(21), May 21, 2001, 3331-3333.

\* cited by examiner

METHOD AND APPARATUS FOR DYNAMIC MANIPULATION AND DISPERSION IN PHOTONIC CRYSTAL DEVICES

CROSS REFERENCE TO RELATED APPLICATIONS

This application is a continuation-in-part of commonly assigned U.S. patent application Ser. No. 10/686,216, filed Oct. 15, 2003 now abandoned by Hamann et al., and of commonly assigned U.S. patent application Ser. No. 10/755, 816, filed Jan. 12, 2004 now U.S. Pat. No. 7,068,865 by Hamann et al., both of which are herein incorporated by reference in their entireties.

BACKGROUND

The invention relates generally to photonic crystals, and relates more particularly to electrical contacts for photonic crystal devices. Specifically, the present invention relates to a method and an apparatus for dynamic manipulation and dispersion in photonic crystal devices.

Photonic crystal-based structures possess a number of unique properties that may be useful as building blocks in photonic integrated circuits (PICS). The ability of photonic crystals to confine light down to scales on the order of a wavelength, as well as low-loss, sharp bends, suggests their suitability for waveguides that can be utilized for compact optical devices. Another notable attribute of photonic crystals is their unique tunable dispersion, which may be exploited to "slow" the velocity of light for interference-based devices, such as switches.

The material systems most suitable for photonic crystal devices are those that have a large refractive index contrast (e.g., silicon, gallium arsenide, germanium) and a low absorption coefficient, as these materials produce a large photonic band-gap. Conveniently, many suitable photonic crystal materials may also function as semiconductor materials, making opto-electronic integration a natural fit. There are many ways to achieve opto-electronic interactions; the most efficient method depends heavily on the properties of the material and the nature of the device. Mechanisms to induce an optical change from an electronic input include changing the refractive index by application of an electric field, injecting carriers, or thermo-optic effects. These interactions commonly require electrical contacts to be placed in the vicinity of the optical device. For example, contacts to apply a voltage to induce resistive heating in a waveguide, or contacts to allow current injection into a resonant cavity, must be placed near the optical device in order to function effectively.

To date, it has proven difficult to combine electronic control with high refractive index, high confinement systems without distorting the optical field and inducing unwanted absorption. Thus, efforts to integrate electronic control with photonic crystal devices are confronted with two competing concerns: (1) the need to place the electrical contacts as close to the optical mode as possible to achieve optimal control; and (2) the need to space the electrical contacts far enough away from the optical mode to minimize distortion and absorption.

Thus, there is a need for a method and an apparatus for dynamic manipulation and dispersion in photonic crystal devices.

SUMMARY OF THE INVENTION

The present invention is a method and an apparatus for dynamic manipulation and dispersion in photonic crystal devices. In one embodiment, a photonic crystal structure comprises a substrate having a plurality of apertures formed therethrough, a waveguide formed by "removing" a row of apertures, and a plurality of pairs of lateral electrical contacts, the lateral electrical contact pairs extending along the length of the waveguide in a spaced-apart manner. The lateral electrical contact pairs facilitate local manipulation of the photonic crystal structure's refractive index. Thus, optical signals of different wavelengths that propagate through the photonic crystal structure can be dynamically manipulated.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Figures 1, 2:
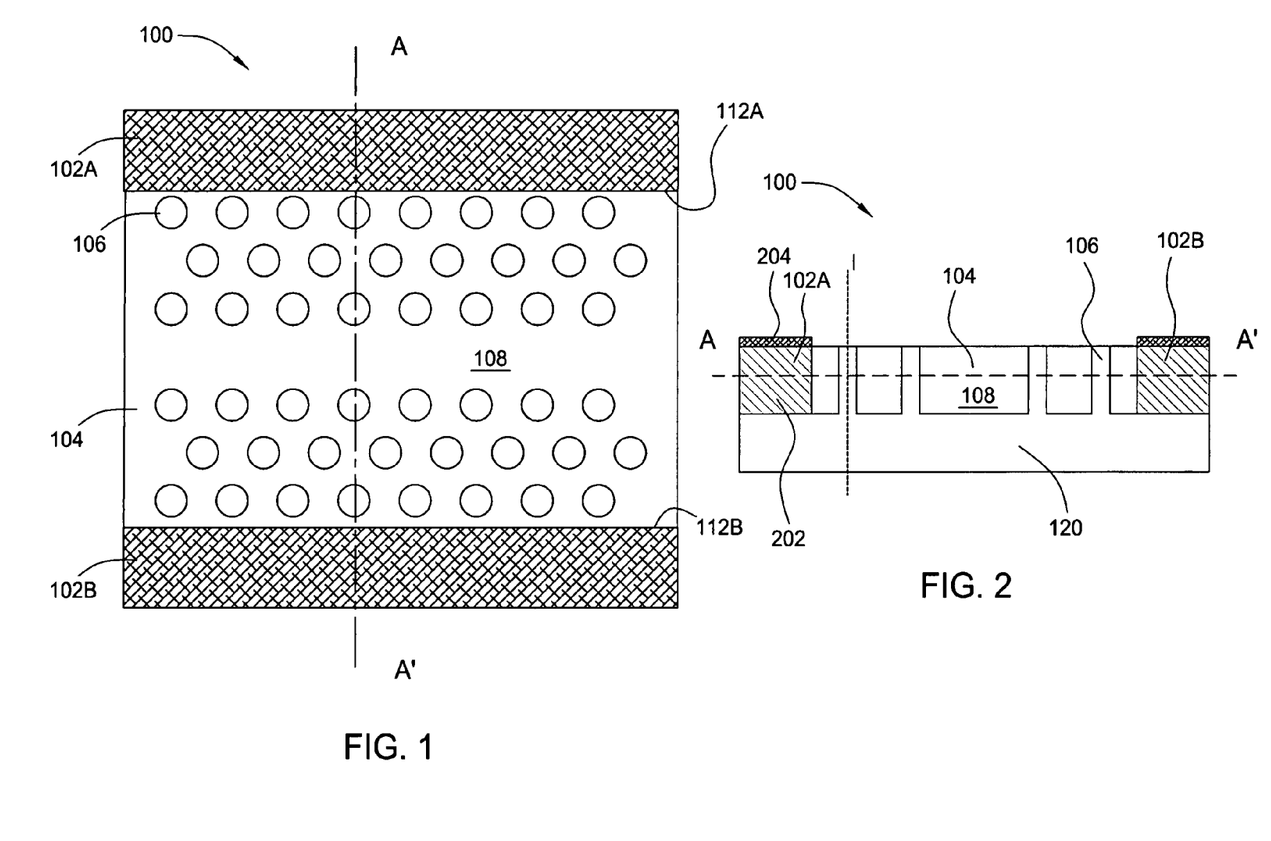
FIG. 1 illustrates a top plan view of one embodiment of a photonic crystal structure with lateral contacts according to the present invention.
FIG. 2 illustrates a cross-sectional view of the photonic crystal structure illustrated in FIG. 1.

FIG. 1 is a top plan view of one embodiment of a two-dimensional photonic crystal structure 100 with lateral contacts 102*a* and 102*b* (hereinafter collectively referred to as "contacts 102") according to the present invention. The photonic crystal structure 100 comprises a substrate 104, a plurality of apertures 106 formed in the substrate 104, a waveguide 108, and first and second lateral electrical contacts 102*a* and 102*b*.

As illustrated in FIG. 2, which is a cross-sectional view of the photonic crystal structure 100 taken along line A-A' of FIG. 1, the apertures 106 extend substantially completely through the substrate 104 (i.e., like channels) to an optical isolation layer 120, and the apertures 106 are arranged in rows to form a periodic lattice. The waveguide 108 is positioned to form a sort of channel through the lattice structure, with several rows of apertures 106 extending outward from the longitudinal edges of the waveguide 108. The first electrical contact 102*a* is positioned proximate to the waveguide 108, and in one embodiment the first electrical contact 102*a* is positioned proximate to a first edge 112*a* of the substrate 104, substantially parallel to the waveguide 108 and spaced apart therefrom by a plurality of apertures 106. The second electrical contact 102*b* also positioned proximate to the waveguide 108, and in one embodiment the second electrical contact 102*b* is positioned proximate to a second edge 112*b* of the substrate 104 opposite to the first edge 112*a*, also substantially parallel to the waveguide 108 and spaced apart therefrom by a plurality of apertures 106. The optical isolation layer may comprise any suitable optical isolation material including, but not limited to, air or silicon dioxide.

In one embodiment, the substrate 104 is formed from a high refractive index material. The magnitude of the refractive index is a relative value; i.e., the substrate material 104 has a high refractive index relative to the refractive indices of the apertures 106, and in one embodiment, the refractive index contrast is greater than 1:1. Suitable high refractive index materials include, but are not limited to, Group IV materials (including silicon, carbon, germanium and alloys thereof, among others), Group III-VI materials (including gallium arsenide, gallium phosphide, indium phosphide, indium arsenide, indium antimonide, and alloys thereof, among others), and Group II-IV materials (including zinc oxide, zinc sulfide, cadmium sulfide, cadmium selenide, cadmium tellurium, and alloys thereof, among others). Forms of silicon that may be used include single crystalline, polycrystalline and amorphous forms of silicon, among others. Polysilicon or amorphous silicon may be particularly advantageous for applications where cost and ease of fabrication and process integration are concerns. In addition, metals such as aluminum, tungsten, gold, silver and palladium, among others, as well as semiconductors may be used to advantage.

In one embodiment, the photonic crystal structure 100 is part of an optical delay line. In another embodiment, the photonic crystal structure 100 is part of an optical modulator. Although the embodiment illustrated in FIG. 1 depicts a two-dimensional photonic structure 100, those skilled in the art will appreciate that the present invention may also be incorporated into one- or three-dimensional photonic crystal structures as well.

The waveguide 108 has a refractive index that substantially matches the refractive index of the substrate 104, and therefore may be formed by "removing" a row of apertures 106. In one embodiment, this is accomplished by filling a row of apertures 106 with a material having a refractive index that substantially matches that of the substrate 104. In the lateral direction (i.e., substantially perpendicular to the longitudinal axes l of the apertures 106), light is confined to the waveguide region by Bragg scattering. In the vertical direction (i.e., substantially parallel to the longitudinal axes l of the apertures 106), light is confined in the waveguide region by total internal reflection (TIR). Thus it is possible to confine light within the cross-section of the waveguide 108 with very low lateral field extent.

Figure 3:
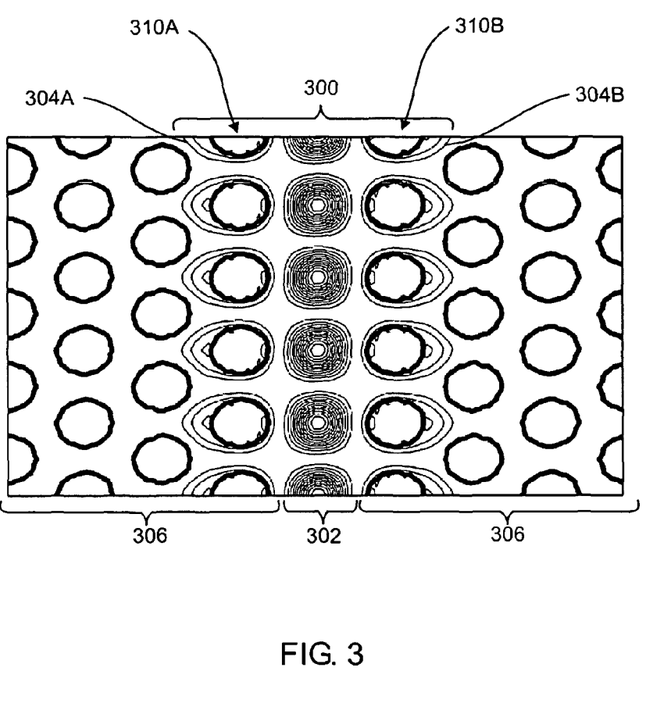
FIG. 3 illustrates a top plan view of the optical power distribution for photons passing through a photonic crystal structure such as that illustrated in FIGS. 1 and 2.

FIG. 3 is a top plan view illustrating the optical power distribution, or "optical mode" 300, for photons passing through a waveguide 302 such as that illustrated in FIGS. 1 and 2. As illustrated, the majority of the optical mode 300 is confined within the waveguide region as described above. The "tails" 304*a* and 304*b*, or the furthest reaching (laterally) edges of the optical mode 300, extend only a few rows into the periodic lattice 306. In the embodiment illustrated in FIG. 3 and in FIG. 4, which is a cross sectional illustration of the waveguide 302 illustrated in FIG. 3, the tails 304*a* and 304*b* reach only one row 310*a* or 310*b* outward from the waveguide region. Typically, the field intensity of the optical mode will decay exponentially as it expands laterally outward into the periodic lattice 306. For example, the evanescent magnetic field is described by the relationship $$H(r) = u(r)e^{i(k+i\kappa)x}$$

where H(r) is the magnetic field vector, u(r) is a periodic function describing the photonic crystal and k+iκ is the complex wave vector. The pre-factor for the decay rate κ is dependent on the effective refractive index, which is a function of the refractive index contrast of the photonic crystal structure 100, the photonic crystal geometry and the mode in consideration.

Figure 4:
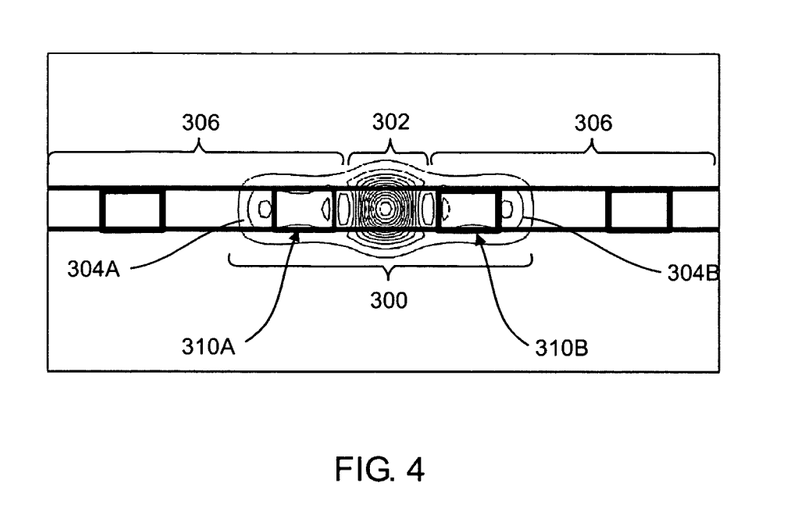
FIG. 4 illustrates a cross sectional view of the optical power distribution through a photonic crystal structure illustrated in FIG. 3.
Figure 11:
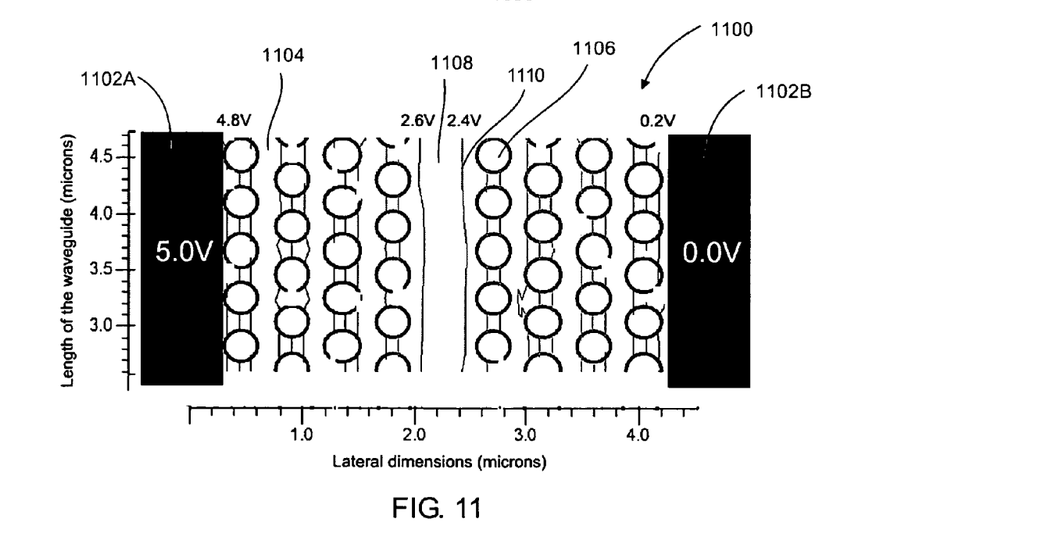
FIG. 11 illustrates a schematic view of the voltage contour lines for one embodiment of a photonic crystal device according to the present invention.

Only a few rows of apertures 106 are therefore necessary to substantially confine light laterally in the waveguide region and optically isolate the contacts 102. For example, FIG. 11 is a schematic illustration of the voltage contour lines between two lateral electrical contacts 1102*a* and 1102*b* that are positioned on either side of a substrate 1104. In the embodiment illustrated in FIG. 11, four rows of apertures 1106 are employed on either side of a two-dimensional waveguide 1108, and a five Volt potential is applied across the waveguide 1108. Equipotential surfaces 1110 are illustrated by gray lines. In the embodiment illustrated, the substrate 1104 is a 220 nm thick silicon slab, the apertures each have a diameter of 315 nm, and the lattice constant, a, is 450 nm. The five Volt potential generates an electric field strength in the region of the waveguide 1108 that is on the order of $5\times10^5$ V/m, and generates current densities of up to approximately $2\times10^7$ A/m². As illustrated in FIGS. 3 and 4, a structure such as that illustrated is capable of substantially confining light within the waveguide region, thereby substantially minimizing absorption in the contact region. At the same time, the electric field strength and the current density generated by the contacts are high enough to change the refractive index of the photonic crystal structure, or inject or collect carriers in the central waveguide region.

Thus, referring back to FIGS. 1 and 2, the electrical contacts 102 may be placed fairly close to the waveguide 108, without disturbing the optical field of light within the waveguide region. This ensures that there will be minimal absorption losses, even if the contacts 102 are formed from a metal or other materials with high absorption losses (e.g., doped semiconductors). Furthermore, as illustrated in FIG. 2, this allows the electrically contacts 102 to be positioned laterally, i.e., on at least the same layer of a photonic crystal device 100 as the light passing therethrough. In other words, the contacts 102 are laterally positioned, at least, on a layer where the light is guided (e.g., where the waveguide 108 is deployed). The deployment of lateral contacts 102 marks a significant advancement over existing photonic crystal designs, as it allows for electrical control over the photonic crystal device without significant absorption of light by the contacts. Although the first and second lateral electrical contacts 102a and 102b are illustrated as being positioned along an edge 112a or 112b of the substrate 104, those skilled in the art will appreciate that the contacts 102 may be placed anywhere on the substrate 104 where they are sufficiently optically isolated from the waveguide region.

Although the embodiment illustrated in FIG. 1 depicts electrical contacts 102 that are separated from a waveguide 108 by three rows of apertures 106, those skilled in the art will appreciate that the invention may be practiced using any number of rows of apertures 106 to optically isolate the contacts 102 from the waveguide 108. The number of apertures 106 necessary to optically isolated the contacts 102 from the waveguide 108 will vary depending on a number of parameters, and in particular on the refractive indices of the photonic crystal substrate 104 and surrounding materials and on the spacing of the apertures 106, as well as the diameter of the apertures 106. The combination of the refractive index contrast and the spacing and the size of the apertures 106 defines the position of the photonic bandgap (i.e., the range of frequencies of the light that will not be transmitted by the photonic crystal structure 100).

For example the size (i.e., diameter) of the apertures 106 and the spacing therebetween is chosen to place the photonic band gap of the photonic crystal structure 100 at a desired frequency of operation. The size and spacing of the apertures depends directly on the refractive indices of the materials forming the photonic crystal structure 100. In one embodiment, the photonic crystal structure 100 is a two-dimensional structure formed from a silicon substrate 104 and having apertures 106 filled with air. The spacing between the apertures 106 is approximately 445 nm, with a ratio of aperture-radius-to-spacing of 0.25-to-0.35. The thickness of the substrate 104 is normalized to the spacing and is 0.5 to 0.6 times as great as the spacing. The photonic band gap is centered at a wavelength of approximately 1.5 µm. In this embodiment, the contacts 102 are spaced from the waveguide 108 by three to six rows of apertures 106.

In one embodiment, the electrical contacts 102 are ohmic contacts formed by doping contact areas on the substrate 104 with a dopant 202 (such as boron, phosphorous or arsenic, among others), and then depositing a metal layer (such as titanium, gold, tungsten, tantalum, palladium or ruthenium, among others) 204 on top of the dopant 202. In one embodiment, the doping concentration for forming the contacts 102 is in the range of about $10^{19}$ to $10^{20}$. In another embodiment, a silicide contact is formed on top of the dopant 202 by depositing a metal (such as nickel, cobalt or titanium, among others) that is later annealed to form a metal silicide. A voltage may then be applied over the contacts 102, and a current will be generated through the waveguide 108. In one embodiment, the dopant concentration is controlled to give an appropriate resistivity that will induce resistive heating, enabling thermo-optic control of the waveguide 108. That is, a phase change in the optical signal passing through the waveguide 108 can be introduced or removed by sequentially heating and cooling the substrate 104. The doping concentration in this case could also be, for example, about $10^{19}$ to $10^{20}$.

Figure 5:
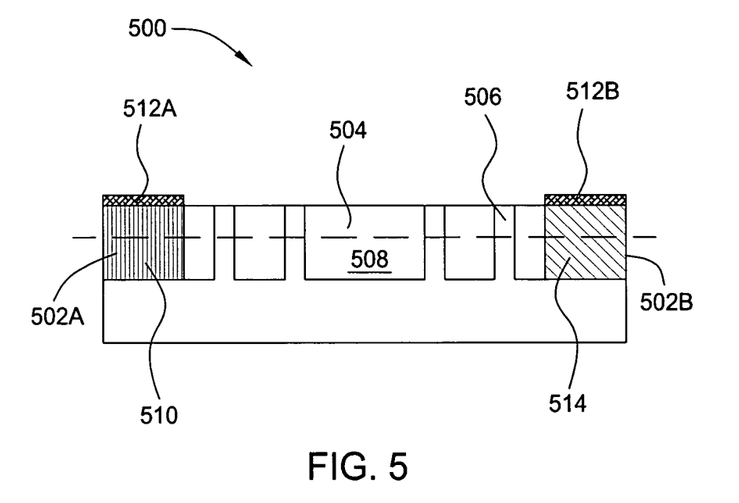
FIG. 5 illustrates another embodiment of a photonic crystal structure according to the present invention, in which the contacts are oppositely doped.

FIG. 5 is a cross sectional view of another embodiment of a photonic crystal structure 500 according to the present invention, in which contacts 502a and 502b are oppositely doped. The photonic crystal structure 500 is substantially similar to the structure 100 illustrated in FIGS. 1 and 2 and comprises a substrate 504, a plurality of apertures 506 formed through the substrate 504, a waveguide 508, and first and second electrical contacts 502a and 502b.

The first contact 502a comprises a p-doped layer 510 and a metal contact 512a disposed over the p-doped layer 510. The second contact 502b comprises an n-doped layer 514 and a metal contact 512b disposed over the n-doped layer 514. Thus each side of the waveguide 508 is oppositely doped. In one embodiment, the waveguide region itself is undoped. In another embodiment, the waveguide region is lightly doped.

In one embodiment, a forward bias is applied to the contacts 502a and 502b, to induce a current that results in carrier injection. A photonic crystal structure 500 such as that illustrated may be particularly well suited for applications involving high frequency switching, as many conventional substrate materials (including Si, and SiGe, among others) tend to exhibit a change in refractive index with a change in carrier concentration. In another embodiment, a reverse bias is applied to the contacts 502a and 502b to enable the photonic crystal structure 500 to function as a waveguide photodetector. If the substrate 504 is formed of a material that is absorbing at an illuminated wavelength, carriers are generated via the photoelectric effect when light passes through the waveguide 508. An electric field in the waveguide sweeps the photo-generated carriers between the contacts 502a and 502b generating a current.

Figure 6:
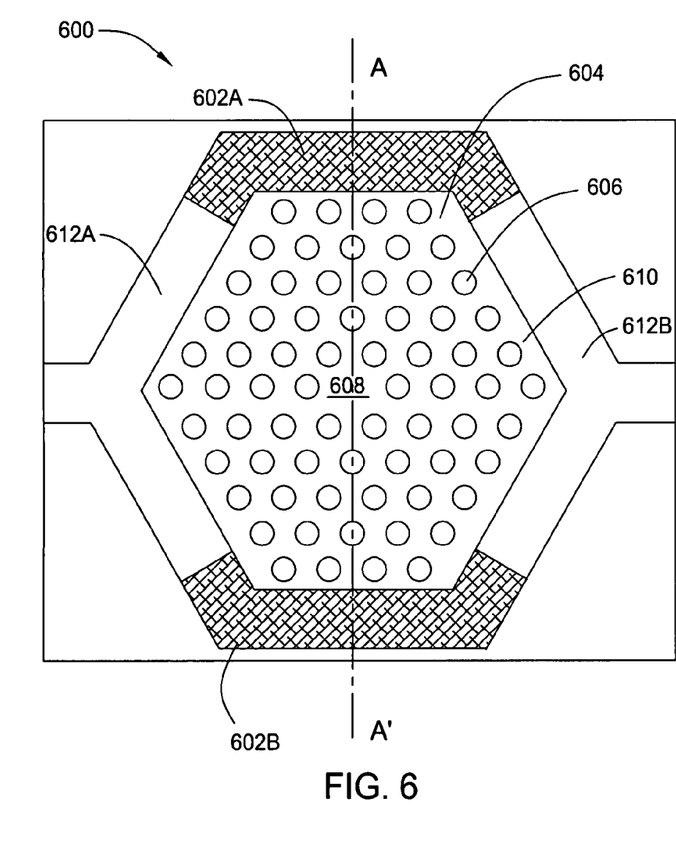
FIG. 6 illustrates another embodiment of a photonic crystal device in which the device is constructed as a resonant cavity.

FIG. 6 is a top plan view of another embodiment of a photonic crystal device 600 in which the device 600 is constructed as a resonant cavity. The photonic crystal device 600 is substantially similar to the photonic crystal devices 100 and 500 described with reference to the preceding Figures, and comprises a substrate 604, a plurality of apertures 606 formed through the substrate 604, a waveguide 608, and first and second electrical contacts 602a and 602b. In contrast to the embodiments illustrated in the preceding Figures, the contacts 602a and 602b are not entirely linear, but rather wrap around a portion of the perimeter 610 of the substrate 604, which in one embodiment is shaped as a hexagon. The waveguide 608 is not formed as a channel, but is instead formed as a cavity (i.e., apertures 606 are "removed" from the center of the substrate 604 to form a waveguide 608 that is surrounded around it perimeter by apertures 606) that confines light. In one embodiment, the photonic crystal device includes first and second trenches 612a and 612b (hereinafter collectively referred to as "trenches 612") that surround the portions of the substrate perimeter that are not adjacent to the contacts 602a and 602b. The trenches 612 substantially prevent charges from traveling the easiest possible route for thermo-optic applications.

Figure 7:
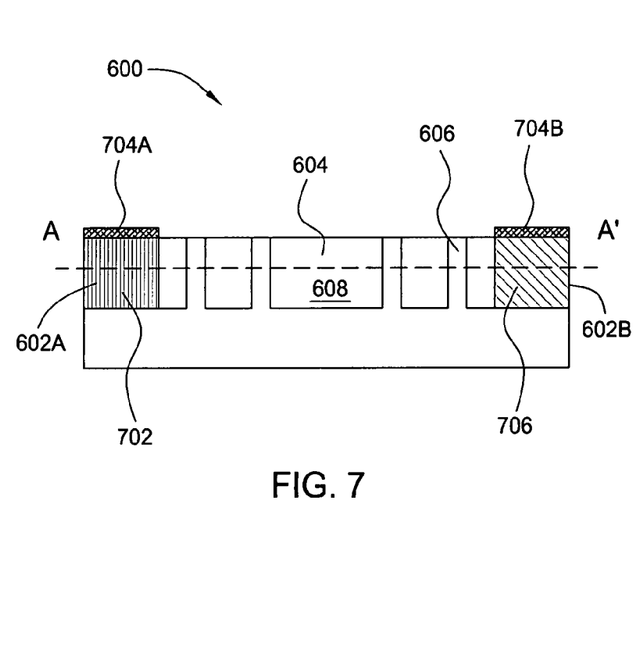
FIG. 7 illustrates a cross sectional view of the photonic crystal device illustrated in FIG. 6.

As illustrated by FIG. 7, which is a cross sectional view of the photonic crystal device 600 illustrated in FIG. 6 taken along line A-A', the contacts 602a and 602b are oppositely doped. The first contact 602a comprises a p-doped layer 702 and a metal contact layer 704a disposed over the doped layer 702. The second contact 602b comprises an n-doped layer 706 and a metal contact layer 704b disposed over the doped layer 706.

Figure 8:
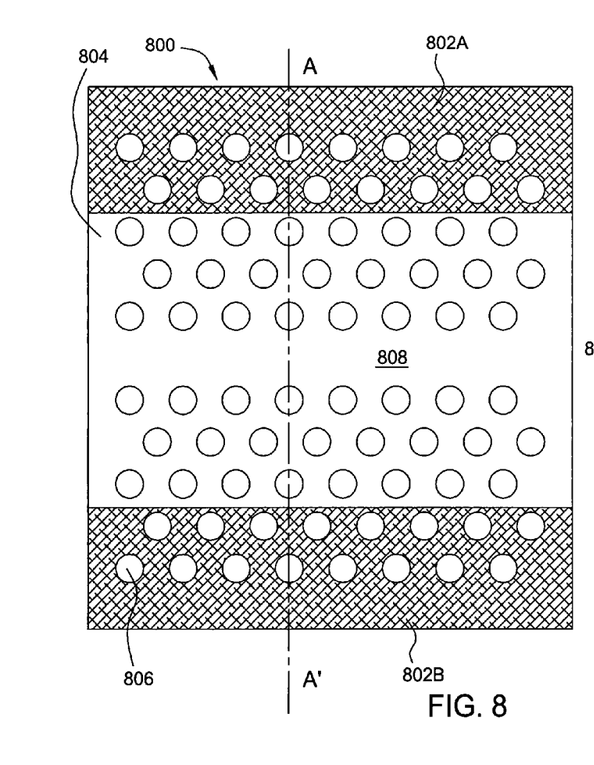
FIG. 8 illustrates another embodiment of a photonic crystal device in which apertures are formed in the lateral electrical contacts.

FIG. 8 is a top plan view of another embodiment of a photonic crystal device 800 in which the apertures 806 extend into the contact area. The photonic crystal device 800 is substantially similar to the photonic crystal devices 100, 500 and 600 described with reference to the preceding Figures, and comprises a substrate 804, a plurality of apertures 806 formed through the substrate 804, a waveguide 808, and first and second electrical contacts 802a and 802b (hereinafter collectively referred to as "contacts 802"). In contrast to the embodiments illustrated in the preceding Figures, some of the plurality of apertures 806 extend into the region of at least one of the contacts 802 and actually extend vertically through the contacts 802. The extension of the apertures 806 into the contact region enhances the optical isolation of the contacts 802 without having to move the contacts 802 any further away laterally from the waveguide 808.

In one embodiment, the apertures 806 are formed in the substrate 804 all the way to the edges, and a mask opening is made in a chemical resist to expose the contact areas. The exposed contact areas are then doped by accelerating doping atoms to the substrate 804; the doping atoms are incorporated only into the areas where openings have been made in the chemical resist mask (i.e., the exposed contact areas). Deposition of metal layers over the doped layers may be achieved in a similar manner.

Figure 9:
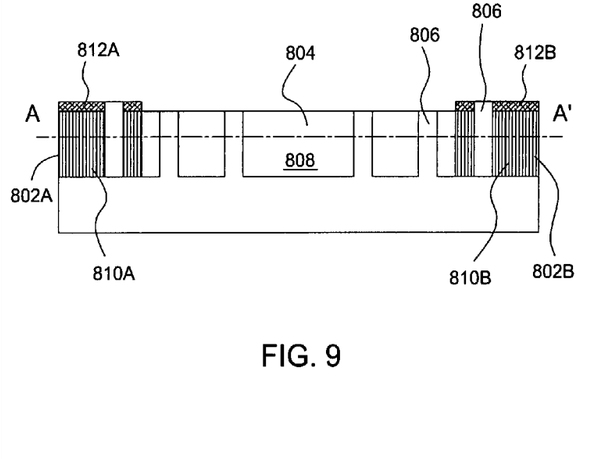
FIG. 9 illustrates a cross sectional view of the photonic crystal device illustrated in FIG. 8.

In one embodiment illustrated by FIG. 9, which is a cross sectional view of the photonic crystal device 800 illustrated in FIG. 8 taken along line A-A', the contacts 802a and 802b are doped. Each contact 802 comprises a doped layer 810a or 810b (hereinafter collectively referred to as "doped layers 810") and a metal contact layer 812a or 812b disposed over the doped layer 810. As in the preceding embodiments, the contacts 802 may be doped with the same material, or, alternatively, the contacts 802 may be oppositely doped, where, for example, the doped layer 810a is p-doped and the doped layer 810b is n-doped. Alternatively, an asymmetric configuration may be constructed by doping one contact and leaving the other contact substantially undoped.

Figure 10:
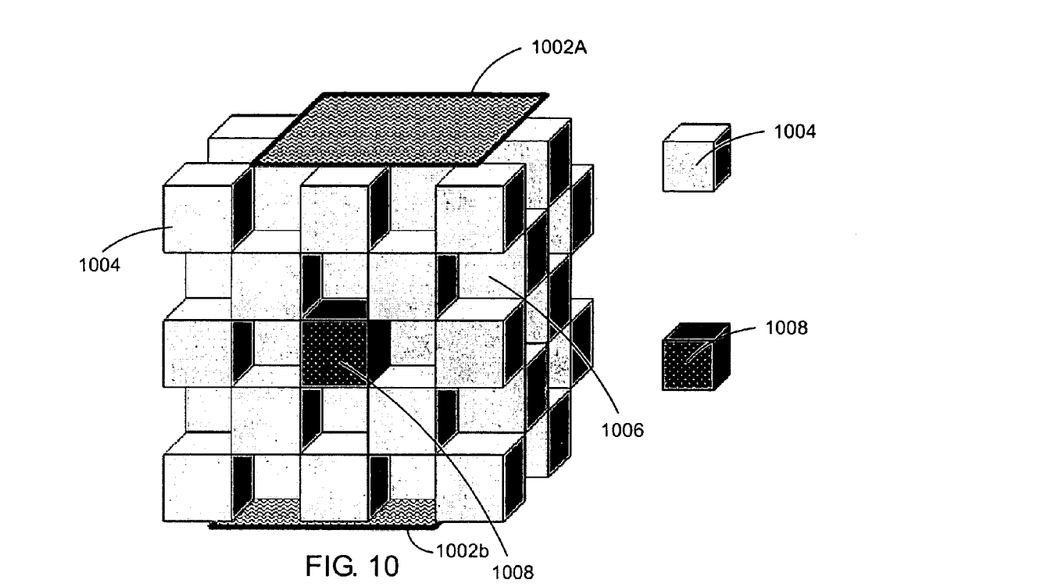
FIG. 10 illustrates a plan view of one embodiment of a three-dimensional photonic crystal structure incorporating lateral electrical contacts.

FIG. 10 is a plan view of one embodiment of a three-dimensional photonic crystal structure 1000 having lateral electrical contacts 1002a and 1002b (hereinafter collectively referred to as "contacts "1002") according to the present invention. The three-dimensional structure 1000 comprises unit cells 1004 and 1006 comprising high refractive index elements (1004) and low refractive index elements (1006) and a waveguide 1008. In one embodiment, the low refractive index elements (or unit cells) 1006 are hollow spaces distributed throughout the structure 1000 (i.e., comparable to the apertures discussed with respect to the two-dimensional structures). The waveguide 1008 is formed as a cavity that localizes or confines light so that the intensity of the light mode decays exponentially with distance from the waveguide 1008. In another embodiment, the waveguide 1008 is formed as a channel that allows light to propagate in one direction while still confining the light in other directions. The contacts 1002 may be formed in a manner similar to the contacts described herein with reference to the preceding Figures, and in one embodiment, the contacts 1002 are positioned at least one unit cell away from the waveguide 1008.

Thus, optical isolation of light is achieved by confining the light to the region of the waveguide 1008 so that it does not attenuate in the contacts 1002. At the same time, the contacts 1002 are close enough to the waveguide 1008 to provide sufficient current and/or electric field strength for applications including, but not limited to, the modulation of the refractive index of the waveguide 1008, or to inject or collect carriers in the region of the waveguide 1008.

Figure 12:
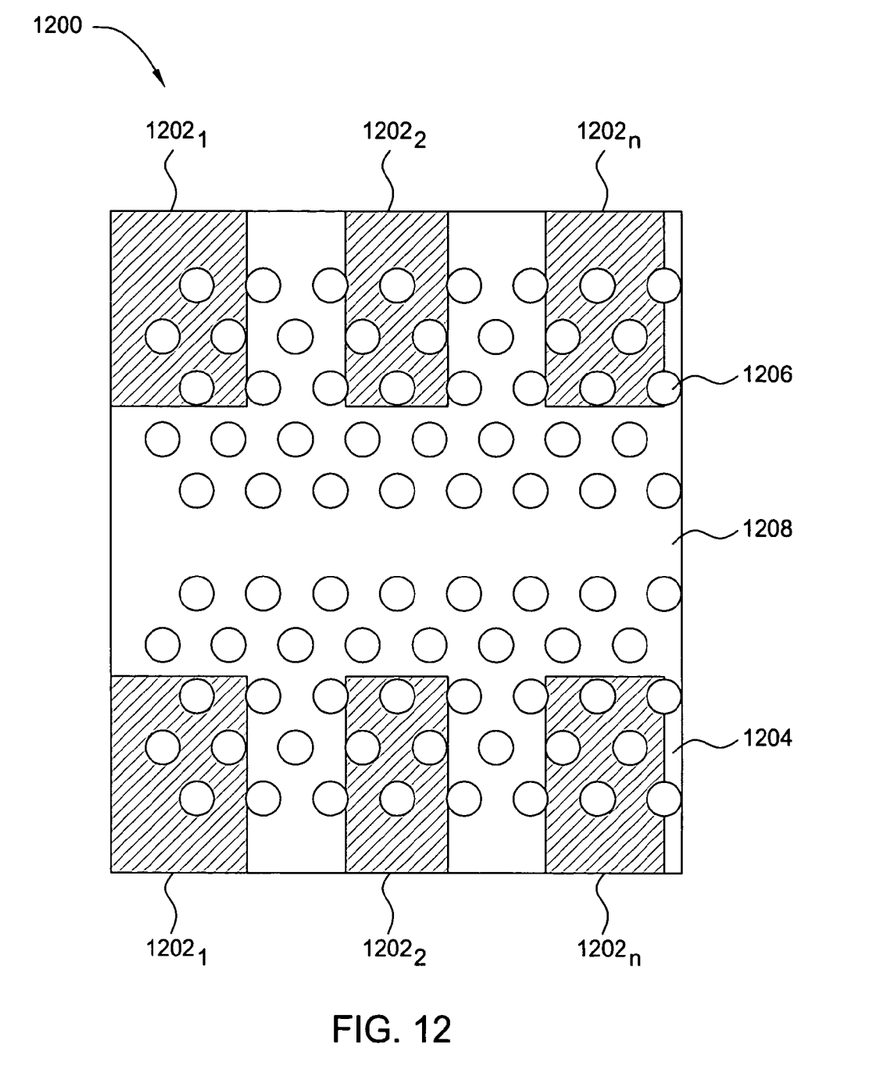
FIG. 12 is a top plan view illustrating another embodiment of a photonic crystal structure, in which a plurality of lateral contact pairs is incorporated.

FIG. 12 is a top plan view illustrating another embodiment of a photonic crystal structure 1200, in which a plurality of lateral contact pairs 1202$_1$-1202$_n$ (hereinafter collectively referred to as "lateral contact pairs 1202") is incorporated. The photonic crystal device 1200 is substantially similar to the photonic crystal devices 100, 500, 600 and 800 described with reference to the preceding Figures, and comprises a substrate 1204, a plurality of apertures 1206 formed through the substrate 1204 and a waveguide 1208. However, in place of and first and second electrical contacts that each extend along at least part of the length of the waveguide 1208, a plurality of lateral contact pairs 1202 is spaced apart along the length of the waveguide. In one embodiment, one contact from each lateral contact pair 1202 is disposed on each side of the waveguide 1208 such that the two contacts are collinear along a line substantially perpendicular to the waveguide 1208.

By providing the lateral contacts as a plurality of lateral contact pairs 1202, the refractive index of the photonic crystal structure 1200 can be locally modulated by producing tightly localized (e.g., having an extension that does not exceed approximately a few microns) "hot spots" between selected lateral contact pairs 1202. That is, the temperature can be locally increased in the regions of the waveguide 1208 between selected lateral contact pairs 1202 by applying voltage to the lateral contact pairs 1202. These local temperature changes induce local changes in the effective refractive index of the waveguide 1208, thereby resulting in local changes in the optical mode dispersion for current (e.g., light) passing through the waveguide 1208. Thus, depending on the operating wavelength, these local changes could induce local slowing or quickening of the group velocity of the optical mode. The deployment of multiple lateral contact pairs 1202 facilitates dynamic adjustment of the group velocity (e.g., for obtaining dispersion compensation or for pulse shaping). In one embodiment, local modulation of the waveguide's refractive index can be achieved on the order of several tens of lattice constants. Thus, optical signals of different wavelengths that propagate through the single waveguide 1208 can be dynamically manipulated. Moreover, by applying voltages to two different lateral contact pairs 1202, an optical cavity can be created in which current can be manipulated.

Figure 13:
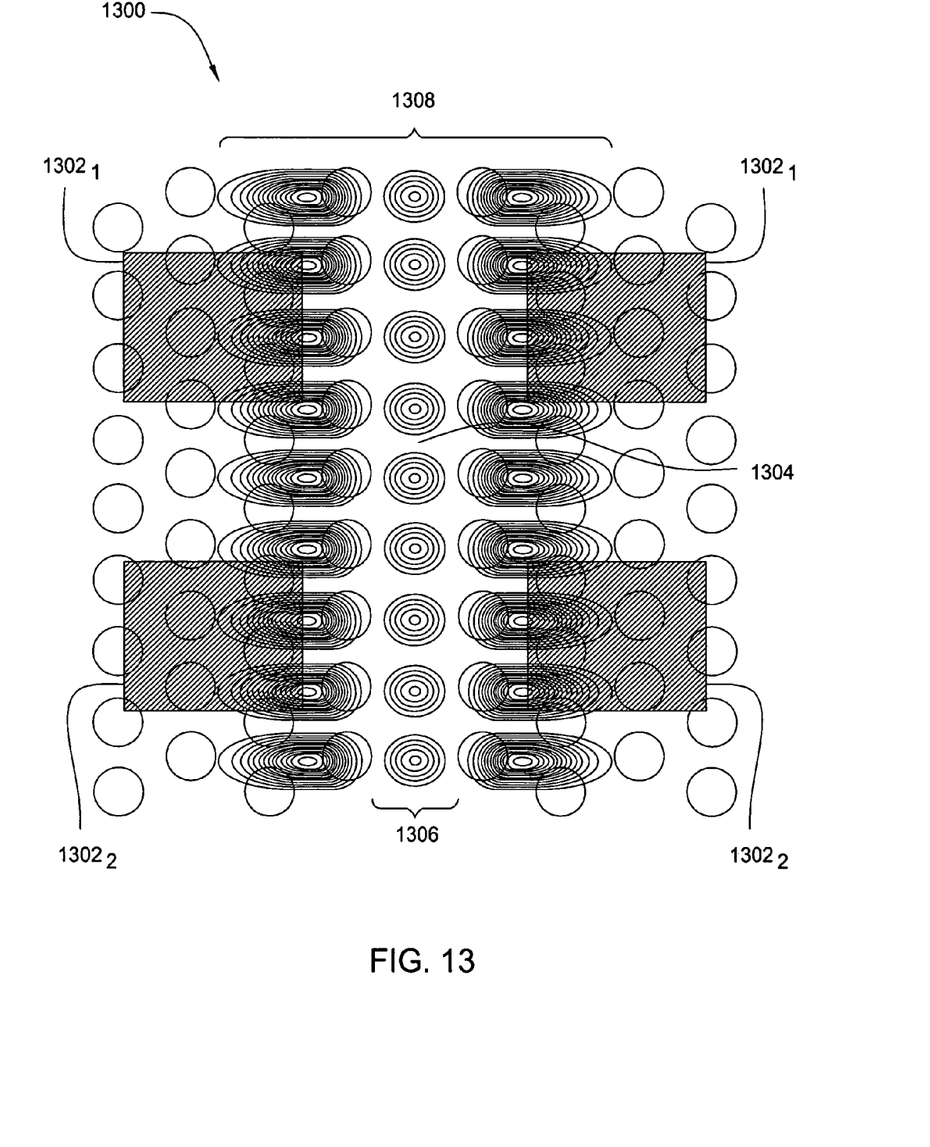
FIG. 13 is a top plan view illustrating another embodiment of a photonic crystal structure, in which two lateral contact pairs are positioned to create an optical cavity when voltage is applied.

FIG. 13 is a top plan view illustrating another embodiment of a photonic crystal structure 1300, in which two lateral contact pairs 1302$_1$ and 1302$_2$ (hereinafter collectively referred to as "lateral contact pairs 1302") are positioned to create an optical cavity 1304 (e.g., in the region of the waveguide 1306 between the four contacts that make up the lateral contact pairs 1302) when voltage is applied. Specifically, FIG. 13 illustrates the optical mode 1308 of a signal passing through a waveguide 1306, where voltage has not been applied to the lateral contact pairs 1302. The lateral contact pairs 1302 are positioned to provide local modulation of the waveguide's refractive index such that signal transmission in the region of the waveguide 1306 between the lateral contact pairs 1302 is prohibited. This is accomplished by establishing two localized "hot spots" (e.g., one hot spot between each lateral contact pair 1302) separated by a small distance (e.g., on the order of the wavelength of the optical signal propagating through the waveguide 1306).

In the transmission spectrum of the photonic crystal device 1300, the resonant transmission peak of the optical cavity 1304 will dominate, with the bandwidth of the resonant transmission peak being defined by the cavity quality factor. Thus, in one embodiment, the photonic crystal structure 1300 may be configured as a narrow-band optical transmission filter. The filter may be dynamically configured by applying voltage to different sets of lateral contact pairs. For example, a central wavelength depending on the extent of adjacent "hot spots" along the waveguide 1306 can be tuned by varying the voltage applied to the lateral contact pairs 1302. In addition, a central wavelength of the cavity resonance can be dynamically tuned in the same manner.

Figure 14:
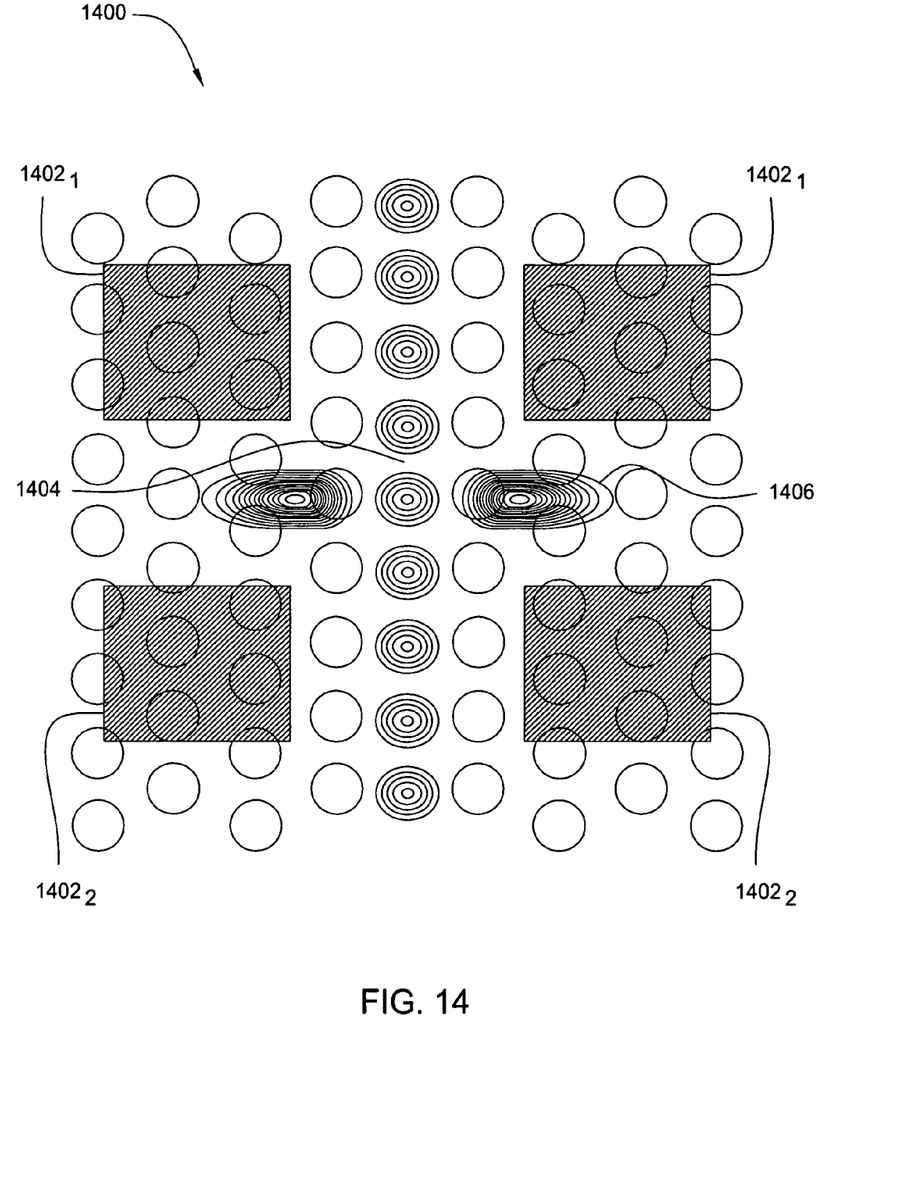
FIG. 14 is a top plan view illustrating a photonic crystal structure that is substantially identical to the photonic crystal structure of FIG. 13, in which voltage is applied to two lateral contact pairs to create an optical cavity.

FIG. 14 is a top plan view illustrating a photonic crystal structure 1400 that is substantially identical to the photonic crystal structure 1300 of FIG. 13, in which voltage is applied to two lateral contact pairs 1402$_1$ and 1402$_2$ (hereinafter collectively referred to as "lateral contact pairs 1402") to create an optical cavity 1404. Specifically, FIG. 14 illustrates the optical mode 1406 of a suppressed signal in the region of the optical cavity 1404. As illustrated, the transmission is suppressed within the region of the optical cavity 1404 due to the local refractive index change induced by the voltage applied to the lateral contact pairs 1402. This produces an optical cavity 1404 with very strong wavelength selectivity, which can be implemented to provide efficient, configurable wavelength filtering.

Thus, the present invention represents a significant advancement in the field of photonic crystal devices. Lateral electrical contact pairs are provided that supply electrical current to the photonic crystal structure, allowing for active control over the photonic crystal properties in local regions. By applying voltage to selected contact pairs, the refractive indices of local regions of the photonic crystal structure can be dynamically manipulated, thereby enabling the manipulation of optical signals of different wavelengths by a single photonic crystal structure.

While foregoing is directed to the preferred embodiment of the present invention, other and further embodiments of the invention may be devised without departing from the basic scope thereof, and the scope thereof is determined by the claims that follow.

The invention claimed is:

1. An apparatus comprising:
   a photonic crystal having a layer where light is guided or is confined through a channel, wherein said photonic crystal is a two-dimensional structure comprising:
      a substrate;
      a plurality of apertures formed through said substrate; and
      a waveguide for guiding said light, wherein said waveguide is formed in said layer where said light is guided or confined and is positioned to form said channel through said plurality of apertures, said channel having a length that extends from a first end to a second end and that is substantially parallel to a direction in which said light propagates through said channel; and
   a plurality of electrical contact pairs positioned in said layer where said light is guided or confined, said plurality of electrical contact pairs being distributed in a spaced apart manner along a transverse dimension of said length of said channel between said first end and said second end, where said channel is positioned an equal lateral distance from all contacts in said plurality of electrical contact pairs, and where at least two of said plurality of contact pairs are positioned in a coplanar orientation to create an optical cavity in a region therebetween.

2. The apparatus of claim 1, wherein said optical cavity is created by applying voltages to said at least two of said plurality of contact pairs such that light is confined to said region.

3. The apparatus of claim 1, wherein said optical cavity is an optical filter.

4. The apparatus of claim 3, wherein said optical filter is configurable.

5. The apparatus of claim 1, wherein said plurality of electrical contact pairs is metallic.

6. The apparatus of claim 5, wherein said plurality of electrical contact pairs have layers that are at least partially doped.

7. The apparatus of claim 1, wherein said substrate comprises at least one of: silicon, carbon, germanium, gallium arsenide, gallium phosphide, indium phosphide, indium arsenide, indium antimonide, zinc oxide, zinc sulfide, cadmium sulfide, cadmium selenide, cadmium tellurium, and alloys thereof.

8. The apparatus of claim 1, wherein each of said plurality of electrical contact pairs comprises:
   a first contact disposed on a first lateral side of said waveguide; and
   a lateral contact disposed on a second lateral side of said waveguide such that said first contact and said second contact are collinear along a line substantially perpendicular to said waveguide and so that said channel resides in a gap defined between the first contact and the second contact,
   wherein all gaps defined by all of the plurality of electrical contact pairs are aligned with each other along said transverse dimension.

9. The apparatus of claim 1, wherein said optical cavity comprises a portion of said waveguide within which transmission of said light is suppressed.

10. The apparatus of claim 1, wherein a refractive index of said optical cavity differs from a refractive index of a remainder of said waveguide.

11. A method for applying electrical control to a photonic crystal structure comprising:
   providing a photonic crystal having a layer where light is guided through a channel having a length that extends from a first end to a second end and that is substantially parallel to a direction in which said light propagates through said channel;
   positioning a plurality of lateral electrical contact pairs in said layer where said light is guided, said plurality of lateral electrical contact pairs being distributed in a spaced apart manner along a transverse dimension of said length of said channel between said first end and said second end, where said channel is positioned an equal lateral distance from all contacts in said plurality of lateral electrical contact pairs; and
   applying a voltage to at least one of said plurality of lateral electrical contact pairs, wherein said applying a voltage comprises:
      establishing an optical cavity in said layer where said light is guided, wherein said establishing an optical cavity comprises:
         applying said voltage to a first lateral electrical contact pair of said at least one of said plurality of lateral electrical contact pairs; and
         applying said voltage to a second lateral electrical contact pair of said at least one of said plurality of lateral electrical contact pairs, spaced apart from said first lateral electrical contact pair in a coplanar orientation, such that light is confined to a region between said first lateral electrical contact pair and said second lateral electrical contact pair.

12. The method of claim 11, wherein said optical cavity is a configurable optical filter.

13. The method of claim 11, wherein said applying a voltage comprises:
   creating at least one localized hot spot in said layer where said light is guided.

14. The method of claim 13, wherein said localized hot spot induces a local change in a refractive index of said photonic crystal structure.

15. The method of claim 11, wherein the providing the photonic crystal comprises:
   providing a substrate;
   forming a plurality of apertures through said substrate; and forming a waveguide for guiding said light, wherein said waveguide is formed in said layer where said light is guided and is positioned to form said channel through said plurality of apertures.

16. The method of claim 15, wherein the positioning a plurality of lateral electrical contact pairs in said layer where said light is guided comprises:

placing a first contact adjacent to a first lateral side of said waveguide; and placing a second contact adjacent to a second lateral side of said waveguide such that said first contact and said second contact are collinear along a first line substantially perpendicular to said waveguide and so that said channel resides in a gap defined between the first contact and the second contact, wherein all gaps defined by all of the plurality of electrical contact pairs are aligned with each other along said transverse dimension.

17. The method of claim 16, further comprising:

placing a third contact adjacent to said first lateral side of said waveguide in a spaced-apart relation relative to said first contact; and placing a fourth contact adjacent to said second lateral side of said waveguide in a spaced-apart relation relative to said second contact, such that said third contact and said fourth contact are collinear along a second line substantially perpendicular to said waveguide.

18. The method of claim 11, wherein a transmission of said light is suppressed within said optical cavity.

19. The method of claim 11, wherein a refractive index of said optical cavity differs from a refractive index of a remainder of said channel.

* * * * *